(12) United States Patent
Sowell et al.

(10) Patent No.: US 6,981,673 B1
(45) Date of Patent: Jan. 3, 2006

(54) WEAR RESISTING SLEEVE SYSTEM FOR AIRCRAFT LANDING ARRESTING CABLES

(75) Inventors: Dale A. Sowell, Alexandria, VA (US); Anh Le, Montgomery Village, MD (US); Eugene C. Fischer, Stevensville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/985,076

(22) Filed: Nov. 5, 2004

(51) Int. Cl.
*B64C 25/68* (2006.01)
(52) U.S. Cl. ............................................... 244/110 C
(58) Field of Classification Search ............ 244/110 C, 244/110 F, 110 R
See application file for complete search history.

(56) References Cited

U.S. PATENT DOCUMENTS

| | | | | |
|---|---|---|---|---|
| 3,010,683 A | * | 11/1961 | Cotton | 244/110 C |
| 3,179,358 A | * | 4/1965 | Schlegel | 244/110 C |
| 3,615,960 A | * | 10/1971 | Hoshii et al. | 156/49 |
| 3,670,997 A | * | 6/1972 | Fonden et al. | 244/110 C |
| 3,799,477 A | * | 3/1974 | Carnevale | 244/110 C |
| 4,328,394 A | * | 5/1982 | Aloisio et al. | 174/106 D |
| 4,660,183 A | * | 4/1987 | McGowan et al. | 367/15 |
| 4,738,504 A | * | 4/1988 | Jones | 385/86 |
| 5,207,302 A | * | 5/1993 | Popp et al. | 188/372 |
| 6,131,873 A | * | 10/2000 | Blazon et al. | 248/548 |

OTHER PUBLICATIONS

"Carrier: Powerhouse of the fleet", Mar. 29, 2004 from http://www.chinfo.navy.mil web site.

* cited by examiner

*Primary Examiner*—J. Woodrow Eldred
(74) *Attorney, Agent, or Firm*—Jacob Shuster

(57) ABSTRACT

The aircraft landing arrest cable has wear resisting sleeves positioned thereon in spaced relation to each other to thereby hold the cable out of contact with a non-skid landing surface in a lowered position of the cable. Stresses imposed on the cable when engaged by a tail hook suspended from aircraft during landing, are absorbed by the wear resisting sleeves which are held clamped in positions on the cables by fluid adhesive previously injected into the sleeves. The wear resisting sleeves are respectively formed from pivotally connected sleeve sections made of an impact shatter-proof and durable material such as polyurethane with abutting edges held in contact with each other under a clamped condition of the sleeves on the cable, established by the injected adhesive.

4 Claims, 2 Drawing Sheets

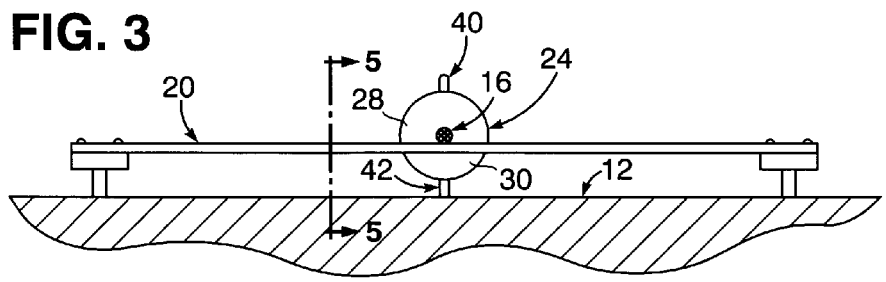
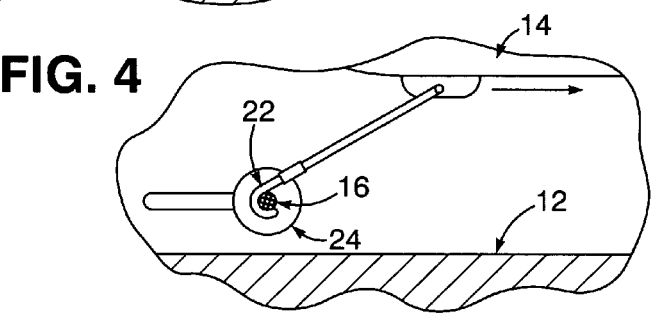
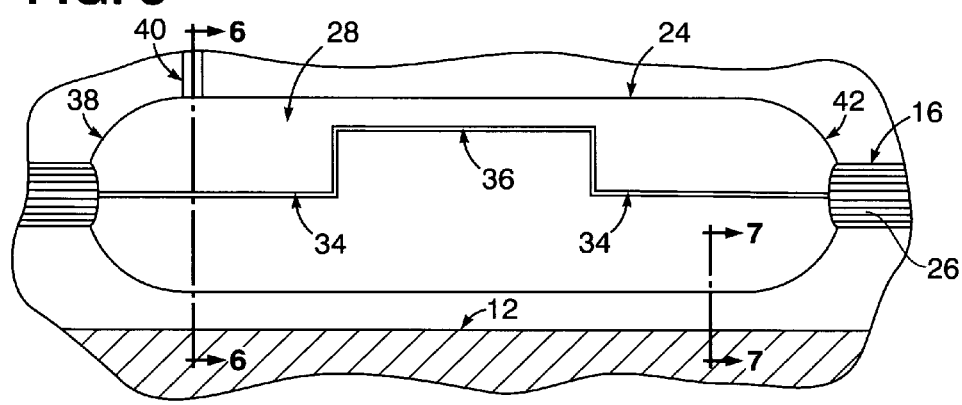
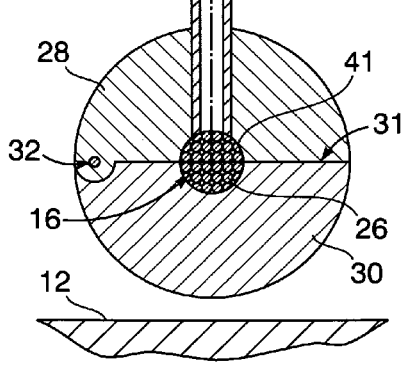
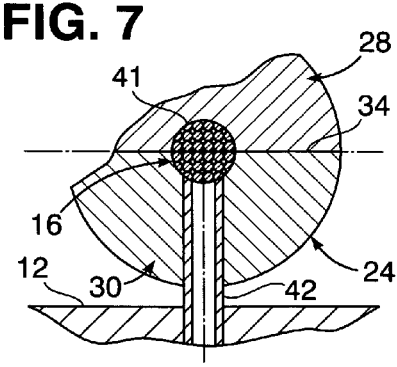

WEAR RESISTING SLEEVE SYSTEM FOR AIRCRAFT LANDING ARRESTING CABLES

STATEMENT OF GOVERNMENT INTEREST

The invention described herein may be manufactured and used by or for the Government of the United States of America for governmental purposes without the payment of any royalties thereon or therefore.

The present invention relates generally to cables and lift devices for arresting aircraft landing on a non-skid deck surface of an aircraft carrier.

BACKGROUND OF THE INVENTION

Arresting cables are retractably anchored to the non-skid surface deck of an aircraft carrier having cable and lift devices used for landing retrieval of aircraft. Such cables are now often replaced because of repeated impact engagement by aircraft arresting hooks and abrasion by the non-skid surface. Also, the non-skid deck landing surfaces require routine repair because of abrasion and slapping motion of the arresting cables in contact therewith. It is therefore an important object of the present invention to prolong the life of such aircraft arresting cables, reduce the frequency of repair and/or replacement of the non-skid deck surface and eliminate use of cable lift devices during aircraft landing arrestment.

SUMMARY OF THE INVENTION

Pursuant to the present invention, aircraft arresting cables held stretched across the non-skid deck surface of an aircraft carrier have positioned thereon wear resisting sleeves spaced above the deck surface. The sleeves are made of a durable, shatter-proof material to absorb impact imposed by aircraft tail hook engagement of the cables during landing as well as to reduce cable surface abrasion by maintaining the cables out contact with the deck surface throughout. The purposes of the present invention are achieved without lift devices by use of the sleeves firmly held in desired spaced positions on the cables by clamping thereof between pivotally connected sleeve sections. Clamping is effected by injection of adhesive into the enclosure within each of the sleeves through which the cable extends and sealing of the injected adhesive fluid within the sleeves.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 3 is a partial section view taken substantially through a plane indicated by section line 3—3 in FIG. 2;

FIG. 4 is a partial section view taken substantially through a plane indicated by section line 4—4 in FIG. 2;

FIG. 5 is a section view taken substantially through a plane indicated by section lines 5—5 in FIG. 3; and FIGS. 6 and 7 are partial section views taken substantially through planes indicated by section lines 6—6 and 7—7 in FIG. 5.

DETAILED DESCRIPTION OF PREFERRED EMBODIMENT

Figure 1:
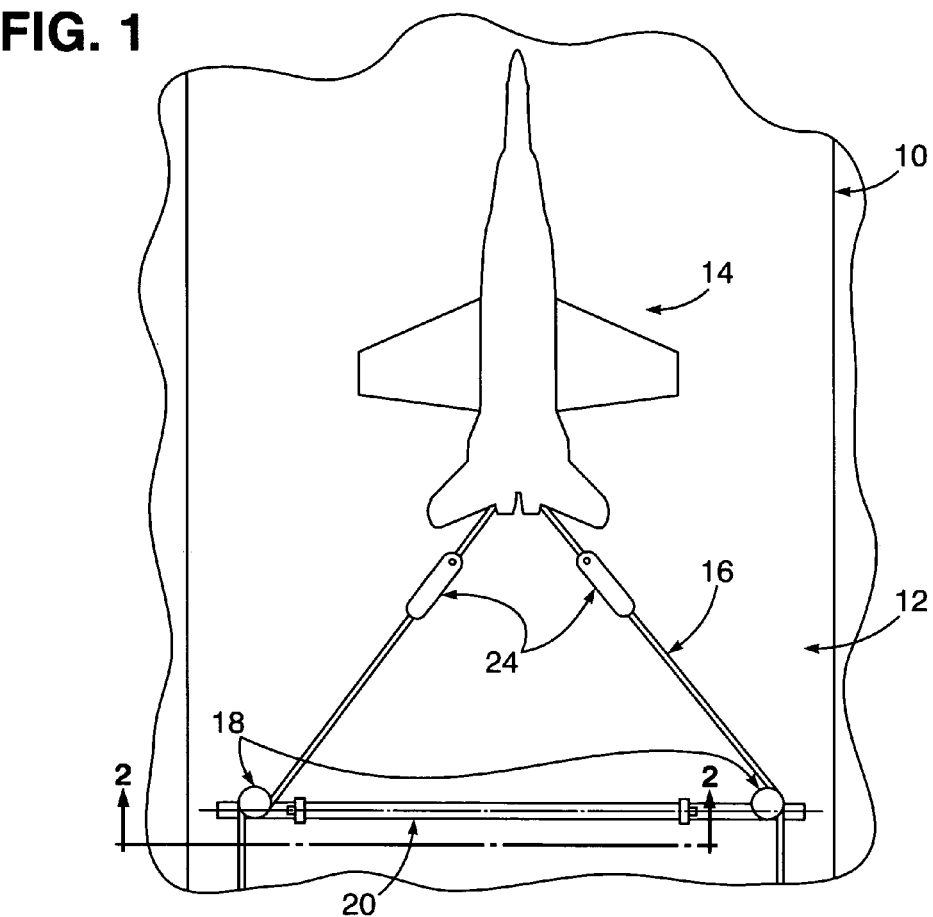
FIG. 1 is a partial top plan view through an upper deck portion of an aircraft carrier with an arresting cable engaged by tail hooks of an aircraft during landing.
Figure 2:
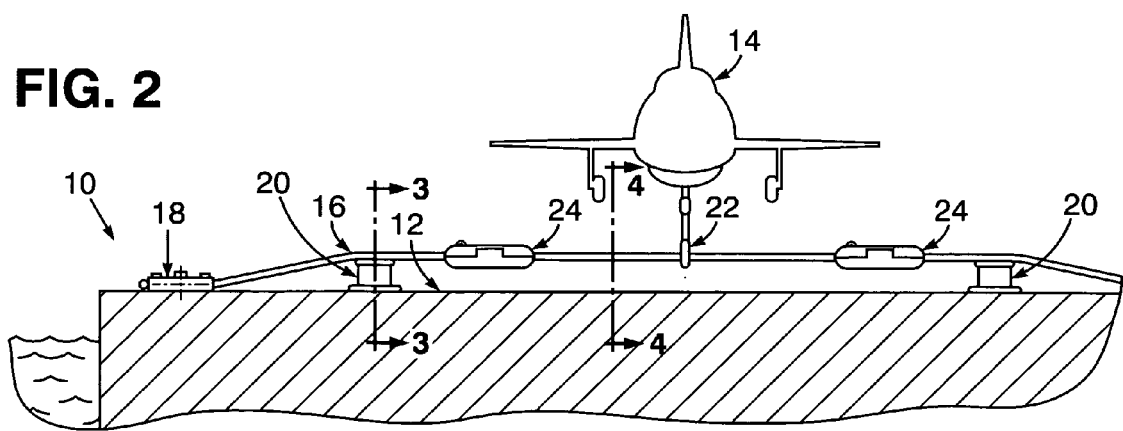
FIG. 2 is a section view taken substantially through a plane indicated by section line 2—2 in FIG. 1 with the arresting cable shown in its raised position above the deck surface.

Referring now to the drawing in detail, FIGS. 1 and 2 illustrate a top deck portion of an aircraft carrier vessel hull 10 having a non-skid deck surface 12. An aircraft 14 is shown about to land on the deck surface 12 while traveling thereabove in an aft to forward direction relative to the vessel hull 10. A flexible arresting cable 16 as generally known in the art is shown in FIG. 1 extended from anchor locations established by retraction sheaves 18 attached to the deck surface 12 at locations adjacent opposite port and starboard sides of the vessel hull 10. The arresting cable 16 may be raised above the deck surface 12 by lift devices 20 as shown in FIGS. 2 and 3 so as to accommodate engagement thereafter of the cable 16 by a tail hook 22 suspended from the aircraft 14 during its first speed forward motion as shown in FIGS. 2 and 4, to arrest such motion during a landing operation. The cable 16 is accordingly extended by being pulled forwardly from its lifted position by the aircraft 14 through the tail hook 22 as shown in FIG. 1. The lift devices 20 will wear off with time and may be eliminated since the cable 16 is maintained in its lifted position above the surface 12 as hereinafter explained.

Pursuant to the present invention, the cross-deck positioned arresting cable 16 is provided with a plurality of cylindrical protective wear resisting sleeves 24 positioned in spaced relation to each other at locations on the cable 16 between which the cable 16 is engaged by the aircraft tail hook 22 as shown in FIGS. 1 and 2. The arresting cable 16 before being raised above the deck surface 12 by the lift devices 20, is held out of contact with the deck surface 12 by the wear resisting sleeves 24. The aircraft arresting cable 16, which may be formed from a plurality of strands 26 as shown in FIG. 6, is furthermore protected against damage due to impact with the deck surface 12 during the landing operation by the wear resisting sleeves 24 as shown in FIGS. 5, 6 and 7. Each of the sleeves 24 is positioned on the cable 16 by clamping thereof between its sleeve sections 28 and 30 pivotally connected to each other by a pivot 32 as shown in FIG. 6. In such cable clamping condition of the sleeve 24, the sleeve sections 28 and 30 engage each other along parallel spaced edge portions 34 and 36 as shown in FIG. 5. The sleeve sections 28 and 30 may be made of a cross deck pendant material such as a synthetic polyurethane. Examples of such material include: Aramid fibers (Kevlar Nomex), Crystal Polyester (Teschnora), high modulus polyethylene (Spectra), Nylon and Fiber X.

As shown in FIGS. 5, 6 and 7, one tapered axial end 38 of the sleeve 24 from which the cable 16 extends, has an elongated flexible injection tube 40 extending through the upper sleeve section 28 through which a fluid adhesive from a suitable source is injected into a cross-sectionally circular enclosure 41 formed within the sleeve 24. The cable 26 extends through the enclosure 41 enclosed within the sleeve sections 28 and 30 is held closed by the adhesive sealed within the sleeve 24 by abutment of the sleeve section edges 36 and 38 in the cable clamping condition of the sleeve 24. Outflow of the adhesive from the sleeve 24 is conducted from the lower sleeve section 30 at a location adjacent the other tapered axial sleeve end 42 through outlet tubing 42 as shown in FIG. 7, while the adhesive wears off the cable 16 during use. The tubing 42 will wear off as the cable 16 is used. The fluid adhesive injected into the sleeves 24 insure retention thereof in the clamped positions on the arresting cables 16 under tension exerted by the tail hook 22 during landing of the aircraft 14 on the deck surface 12.

As a result of the foregoing described positioning and use of the wear resisting sleeves 24 on the aircraft arresting cables 16, wear of the non-skid deck surface 12 is minimized and the operational life of the cables 16 is prolonged so as to avoid frequent repair or replacement of the non-skid deck surface 12.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a cable for arresting motion of an aircraft on a non-skid surface during landing thereon, a system for minimizing wear of the non-skid surface and impact damage of the cable by slapping motion imposed thereon by the aircraft, comprising: protective means positioned on the cable at spaced locations for preventing contact thereof with the non-skid surface; and clamping means for holding the protective means positioned at said locations on the cable during engagement thereof by the aircraft, said protective means comprising: a plurality of cylindrical sleeves made of wear resisting material held at said spaced locations on the cable by the clamping means; each of the cylindrical sleeves comprising: a pair of arcuate sections having non-aligned abutting edges adhesively held in contact with each other by the clamping means; and pivot means for pivotally interconnecting said arcuate sections; to releasably hold the abutting edges in abutment with each other about the cable.

2. The combination as defined in claim 1, wherein said clamping means comprises: adhesive injected into the cylindrical sleeves of the protective means.

3. The combination as defined in claim 2, wherein said non-skid surface is a deck of an aircraft carrier hull.

4. The combination as defined in claim 3, wherein the deck is provided with selectively controlled lift means for raising the cable with the protective means out of contact with the deck before said engagement thereof by the aircraft.

* * * * *